United States Patent
Costa-Requena et al.

(10) Patent No.: US 7,154,864 B2
(45) Date of Patent: Dec. 26, 2006

(54) METHOD AND APPARATUS FOR PROVIDING CONFERENCE CALL ANNOUNCEMENT USING SIP SIGNALLING IN A COMMUNICATION SYSTEM

(75) Inventors: Jose Costa-Requena, Helsinki (FI); Jarmo Kuusinen, Tampere (FI); Inmaculada Espigares, Helsinki (FI)

(73) Assignee: Nokia Corporation, Espoo (FI)

( * ) Notice: Subject to any disclaimer, the term of this patent is extended or adjusted under 35 U.S.C. 154(b) by 382 days.

(21) Appl. No.: 10/377,149

(22) Filed: Feb. 28, 2003

(65) Prior Publication Data

US 2004/0202303 A1     Oct. 14, 2004

(51) Int. Cl.
*H04L 12/16* (2006.01)
*H04M 3/42* (2006.01)

(52) U.S. Cl. .................................. 370/261; 379/205.01

(58) Field of Classification Search ................ 370/260, 370/261, 390, 262, 312, 352, 389, 395.52, 370/522, 395.2, 466–467; 709/202.01, 204.01, 709/205.01, 203.01
See application file for complete search history.

(56) References Cited

U.S. PATENT DOCUMENTS

| | | | | |
|---|---|---|---|---|
| 4,796,293 A | * | 1/1989 | Blinken et al. ........ | 379/202.01 |
| 5,483,352 A | * | 1/1996 | Fukuyama et al. ......... | 358/402 |
| 6,714,793 B1 | * | 3/2004 | Carey et al. ................ | 455/466 |
| 6,757,365 B1 | * | 6/2004 | Bogard ..................... | 379/88.17 |
| 2002/0141381 A1 | * | 10/2002 | Gawargy et al. ............ | 370/352 |
| 2003/0016657 A1 | * | 1/2003 | Creamer et al. ............ | 370/352 |
| 2003/0095510 A1 | * | 5/2003 | Dorenbsoch ................ | 370/260 |
| 2003/0145054 A1 | * | 7/2003 | Dyke ......................... | 709/205 |
| 2003/0158900 A1 | * | 8/2003 | Santos ........................ | 709/205 |
| 2004/0008680 A1 | * | 1/2004 | Moss et al. ................. | 370/390 |
| 2004/0071099 A1 | * | 4/2004 | Costa-Requena et al. ... | 370/260 |
| 2004/0125802 A1 | * | 7/2004 | Lillie et al. ................. | 370/390 |
| 2004/0203664 A1 | * | 10/2004 | Lei et al. ................. | 455/414.1 |

OTHER PUBLICATIONS

*Understanding SIP Servers*, Radvision Ltd., 2002; pp. 1-28.
*SIP: Protocol Overview*, Radvision Ltd., 2001; pp. 1-15.
*SIP: Session Initiation Protocol*, RFC 2543, Handley, et al; Mar. 1999; pp. 1-153.

* cited by examiner

*Primary Examiner*—Brian Nguyen
(74) *Attorney, Agent, or Firm*—Ware, Fressola, Van Der Sluys & Adolphson LLP (57) ABSTRACT

A method and corresponding equipment for setting up a conference call via a communication network that uses session initiation protocol (SIP) signalling for call setup, the method including steps (E1*a* E2*a* E3*a* E4*a*) of providing during the call setup signalling to a subscriber invited to participate in the conference call an indication that the call is a conference call and including in the call setup signalling a reference to a group document indicating information about the conference call, such as the other invited participants, or including the group document itself.

19 Claims, 4 Drawing Sheets

METHOD AND APPARATUS FOR PROVIDING CONFERENCE CALL ANNOUNCEMENT USING SIP SIGNALLING IN A COMMUNICATION SYSTEM

TECHNICAL FIELD

The present invention relates to providing additional information during a call setup via a communication system using SIP (Session Initiation Protocol) signalling for call setup, and in particular, for indicating that an incoming call is a conference call, i.e. a call involving with more than two participants.

BACKGROUND ART

It is known in the art for a communication system (possibly including one or more wireless or radio access networks) to provide group or conference calling. It is also known in the art to use SIP (Session Initiation Protocol) to set up a call between two or more call participants when at least one is a subscriber to a communication network (and so communicates with the other participants over a communication path that includes the radio access network of the communication network). Additionally, it is known in the art to use a SIP INVITE method (a message or in other words a communication) having a Call-Info header containing a URL (Uniform Resource Locator) referring to (a document or file providing) supplementary call information. In addition, a SIP INVITE method can also have an Alerting-Info header containing a URL referring to a ringing tone or other headers used for including additional information about the session (e.g. the subject to be discussed during the call being set up). The supplementary call information or ringing tone must be fetched by the callee by some additional methods, using e.g. HTTP (hypertext transfer protocol).

What the prior art does not teach, however, is for a mobile caller to provide, as part of call set up signalling, information about a proposed conference call, such as that the call being set up is to be a conference call and who the invited participants are. It would be advantageous to use SIP signalling for call set up to invite subscribers reachable by an originating subscriber to participate in a group or conference call (and so to identify the call as a proposed conference call), and also to use SIP signalling during call set up to provide other services in connection with setting up a conference call, such as to indicate the other invited participants.

DISCLOSURE OF THE INVENTION

Accordingly, in a first aspect of the invention, a method is provided for use by a caller terminal in setting up a conference call for a voice call or messaging session to a callee terminal, the caller terminal subscribed to a component of a communication network including a conference server functioning as a signaling node for the conference call, the communication system using session initiation protocol (SIP) signalling for call set up, the method including a step in which the caller terminal provides according to SIP signalling a call setup communication to the callee terminal either via the conference server or directly, the method characterized in that in the step in which the caller terminal signals to the callee terminal the call setup communication, the caller terminal includes in the call setup communication an indication that the call being set up is a conference call and also includes in the call setup communication either a group document indicating possible participants in the conference call or a reference to the group document.

In accord with the first aspect of the invention, the communication network may include a wireless communication component.

Also in accord with the first aspect of the invention, the method may also comprise a step in which the callee, upon receiving the call setup communication, displays or otherwise provides the indication that the call being set up is a conference call and displays or otherwise provides the group document indicating possible participants in the conference call.

Also in accord with the first aspect of the invention, the call setup communication may be a SIP INVITE or REFER communication including a Call-info header, and the indication that the call being set up is a conference call and the group document or reference to the group document may both be included in the Call-info header. Further, the caller may send the conference server a REFER communication, and in response, the conference server may issue an INVITE communication to the callee. Further still, the conference server may use a uniform resource identifier in a Refer-to header of the REFER communication as a basis for determining that an INVITE communication is to be provided to the callee. Also further, a group server may host a data store holding the group document and the group server may provide a uniform resource locator for the group document upon receiving the group document and storing the group document in the data store, and the reference to the group document may be the uniform resource locator indicating the group document on the group server of the communication network. Further still, the group server may be a component of the conference server. Also further, the reference to the group document may be a reference to a SIP MESSAGE communication sent to the callee. Still also further, the group document may be included in the Call-info header as a multipart mail MIME enclosure. Even still also further, the group document may be included in the Call-info header as XML script.

Also in accord with the first aspect of the invention, the conference server may use the group document as a basis for determining that an INVITE communication is to be provided to the callee. Further, the conference server may be prompted to send an INVITE communication to the callee and to other possible participants included in the group document based on receiving an INVITE communication from the caller. Still further, the INVITE communication prompting the conference server to send an INVITE communication to the callee and to other possible participants in the group document may include a parameter value for indicating to the conference server that the conference server is to send the INVITE communication to the callee and to the other possible participants.

In a second aspect of the invention, a mobile station is provided, comprising means for performing the steps of performed by the caller and the callee according to the first aspect of the invention.

In a third aspect of the invention, a system is provided, comprising: a communication network using SIP signalling for call setup, and including a conference server functioning as a signalling node for enabling a conference call and also including a group server for holding and making accessible group documents indicating members of a group, a caller terminal according to the second aspect of the invention and connected to the communication network, and also a plurality of callee terminals all subscribing to one or another component of the communication network so as to be mutually reachable via the communication network, wherein upon receiving a communication prefatory to a call setup communication and including either a group document or a reference to a group document, the conference server provides a call setup communication including either the group document or the reference to a group document.

In a fourth aspect of the invention, a conference server is provided comprising means for performing the steps according to the first aspect of the invention indicated as steps performed by the conference server.

In a fifth aspect of the invention, a system is provided, comprising a conference server functioning as a signalling node for enabling a conference call and also including a group server for holding and making accessible group documents, upon receiving a communication prefatory to a call setup communication and including either a group document or a reference to a group document, provides a call setup communication including either the group document or the reference to a group document.

In a sixth aspect of the invention, a computer program product is provided comprising: a computer readable storage structure embodying computer program code thereon for execution by a computer processor in a caller terminal in setting up a conference call for a voice call or messaging session to a callee terminal, the caller terminal subscribed to a component of a communication network including a conference server functioning as a signaling node for the conference call, the communication system SIP signalling for call set up, with said computer program code comprising: computer program code for causing the computer processor of the caller terminal to perform a step in which the caller terminal provides according to SIP signalling a call setup communication to the callee terminal either via the conference server or directly; the computer program code characterized in that in the step in which the caller terminal signals to the callee terminal the call setup communication, the caller terminal includes in the call setup communication an indication that the call being set up is a conference call and also includes in the call setup communication either a group document indicating possible participants in the conference call or a reference to the group document.

In a seventh aspect of the invention, a computer program product is provided comprising: a computer readable storage structure embodying computer program code thereon for execution by a computer processor in a conference server in communication with a caller terminal setting up a conference call for a voice call or messaging session to a callee terminal, the caller terminal subscribed to a component of a communication network including the conference server, the conference server functioning as a signaling node for the conference call, the communication system using SIP signalling for call set up, with said computer program code comprising: computer program code for causing the computer processor of the conference server to perform a step in which the conference server provides according to SIP signalling a call setup communication to the callee terminal; the computer program code characterized in that in the step in which the conference server signals to the callee terminal the call setup communication, the conference server includes in the call setup communication an indication that the call being set up is a conference call and also includes in the call setup communication either a group document indicating possible participants in the conference call or a reference to the group document.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The invention provides an extension to SIP call set up signalling in a 3G (Third Generation Partnership Program) wireless communication system so as to indicate to a callee that an incoming call is a group (conference) call, and possibly also to indicate who the invited participants are.

Figure 1:
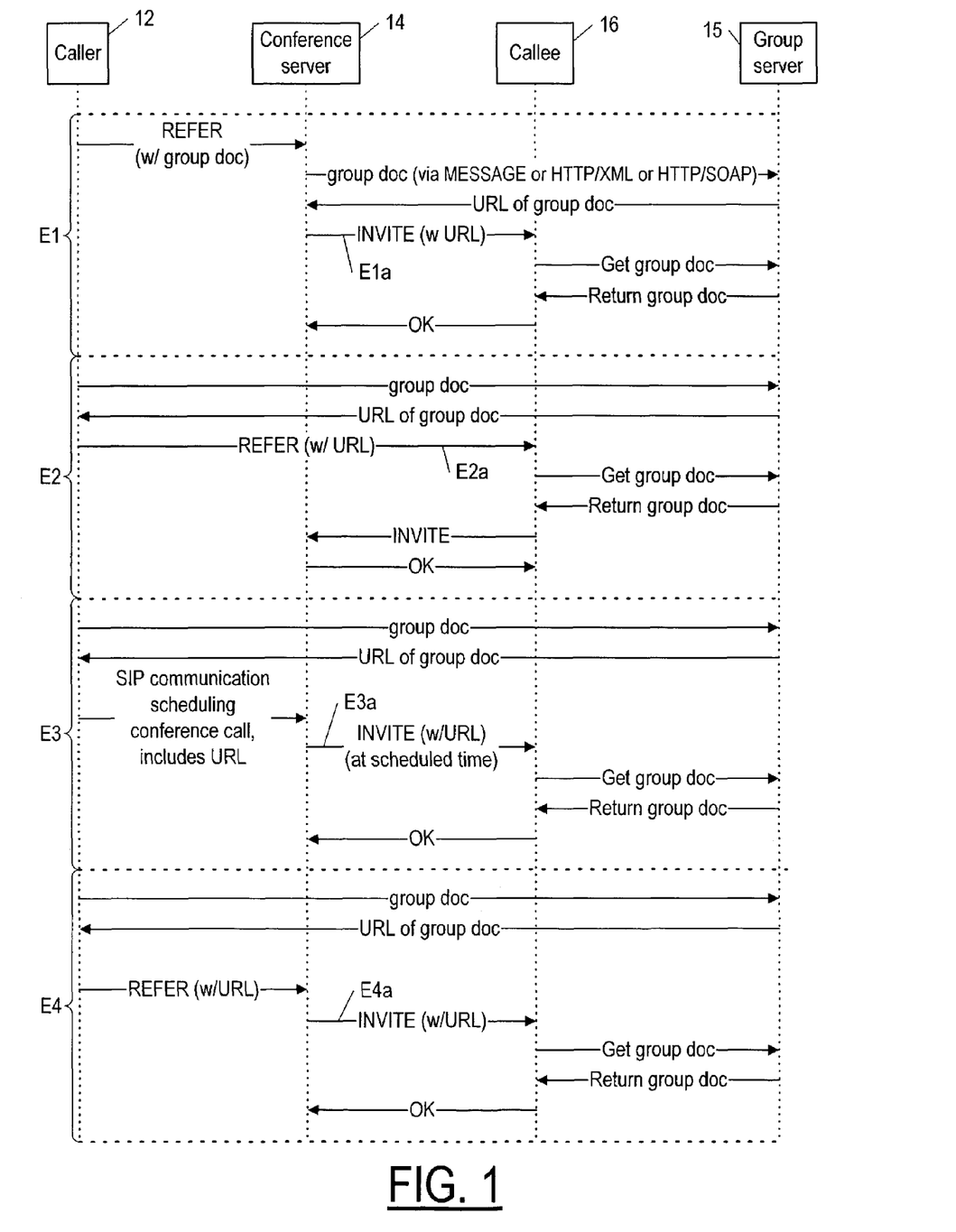
FIG. 1 is a schematic illustrating scenarios in which a conference server sets up a conference call between a caller and callees, according to each of the principal embodiments of the invention, with at least the callees all indicated in a group document.

Referring now to FIG. 1, the invention is shown generally in terms of scenarios according to four embodiments E1 E2 E3 E4, each a method for use by a caller terminal 12 in setting up a call to a callee terminal 16 (as one of several potential participants in a conference call), with the caller terminal 12 subscribed to a component of a communication network, of which only a conference server 14 and a group server 15 are shown, a communication network that uses session initiation protocol (SIP) signalling for call set up. The four embodiments E1 E2 E3 E4 each include a respective step E1a E2a E3a E4a in which the caller terminal 12 signals a call setup communication to the callee terminal 16 according generally to prior art SIP signalling but distinguished from the prior art in that in the step E1a E2a E3a E4a in which the caller terminal 12 signals to the callee terminal 16 (possibly via a conference server 14) the call setup communication, the caller terminal 12 (or conference sever 14) includes in the call setup communication an indication that the call being set up is a conference call, and also includes in the call setup communication a reference to information indicating other invited participants or the information itself.

The scenarios according to the four embodiments E1 E2 E3 E4 indicated in FIG. 1 assume that the conference server 14 and the group server 15 are separate entities. The invention does, however, also apply in arrangements where the conference server 14 and group server are bundled together as a single entity, in which case the message flows shown in FIG. 1 between the conference server 14 and group server 15 are internal data flows. The conference server is a server that functions as a signalling node for conference calls; each participant in a conference call has an SIP dialog with the conference server (which also takes care of mixing the media streams in case of a multimedia conference). The group server contains a repository of groups in a data store (not shown), i.e. a set of contacts, each identified by a group URI (uniform resource identifier), and when a group (i.e. a group document) is added to the group server by an application, the group server returns to the application the URI assigned to the group.

Still referring to FIG. 1, in the scenario according to embodiment E1, in a message communication not shown, the caller terminal 12 first sends an INVITE communication to the conference server 14 for setting the resources in the network, and once the conference server receives the INVITE communication, the session is established between the caller 12 and the conference server 14. Next, in order to initiate a conference call among members of a group, the caller terminal 12 sends a REFER communication to the conference server 14, including in the REFER communication what is here called a group document, i.e. a document indicating who belongs to the group. A REFER communication/method always carries a Refer-to header, which in the invention contains the URI (uniform resource identifier) to which the conference server 14 is to send the INVITE communication. This is so because if the URI in the Refer-to header is a SIP URI, then unless another method, such as "BYE" is indicated in the Refer-to header, the recipient of the REFER communication sends an INVITE communication to the indicated URI. (Besides being used to send an INVITE communication to a URI, A REFER communication/method can also be used to eliminate a participant in a conference call by using the BYE method in the Refer-to header, as in e.g., "Refer-to: ue2@att.com;method=BYE" which results in the recipient of the REFER communication sending a BYE communication to ue2@att.com.

Upon receiving the REFER communication, the conference server 14 then sends the group document to the group server 15 (assumed in the description that follows to be separate from the conference server 14), and can do so by various means, such as e.g. a SIP MESSAGE communication or a HTTP/XML (hypertext transport protocol/extensible markup language) communication or a HTTP/SOAP (simple object access protocol) communication. (XML is as e.g. set out at www.w3.org/TR/REC-XML, and serves to specify a document/web page markup language, such as HTML). The group server 15 then returns to the conference server the URL for the group document. As soon as the URL is received, the conference server 14 sends an INVITE to the callee 16 (as indicated in the Refer-to header of the REFER communication received by the conference server), and includes in the Call-info header of the INVITE the URL of the group document. (As mentioned above, the REFER method/communication always carries a Refer-to header, which contains the URI to which the conference server or other recipient of the REFER communication is to send the INVITE, and in this embodiment it is the Refer-to header of the REFER communication that is used by the conference server as indicating the intended recipient of an INVITE communication, and not the group document. (In E1 the Refer-to header contains the URI of the callee 16, and in E2 the Refer-to header contains the URI of the conference server 14.) Thus, if the caller 12 in embodiment E1 wants to make a conference call to five persons, then (after first setting the session with the conference server by sending an INVITE communication to the conference server) it issues five REFER communications, one for each person. The group document is delivered in this embodiment for informational purposes only; it is not used in orchestrating call setup in any way.

The callee (terminal) 16, upon receiving the INVITE, reads the URL of the group document, retrieves the group document from the group server 15 using the URL, displays (on e.g. an LED screen) or otherwise provides (e.g. by speech or by some predetermined signal) an indication that the call being set up is a conference call and displays or otherwise provides the group document indicating the possible participants in the conference call, and after the (user of the) callee (terminal) 16 inspects the group document, the callee 16 sends a SIP OK communication to the conference server 14, thereby completing call set up (for the callee 16).

Figure 3:
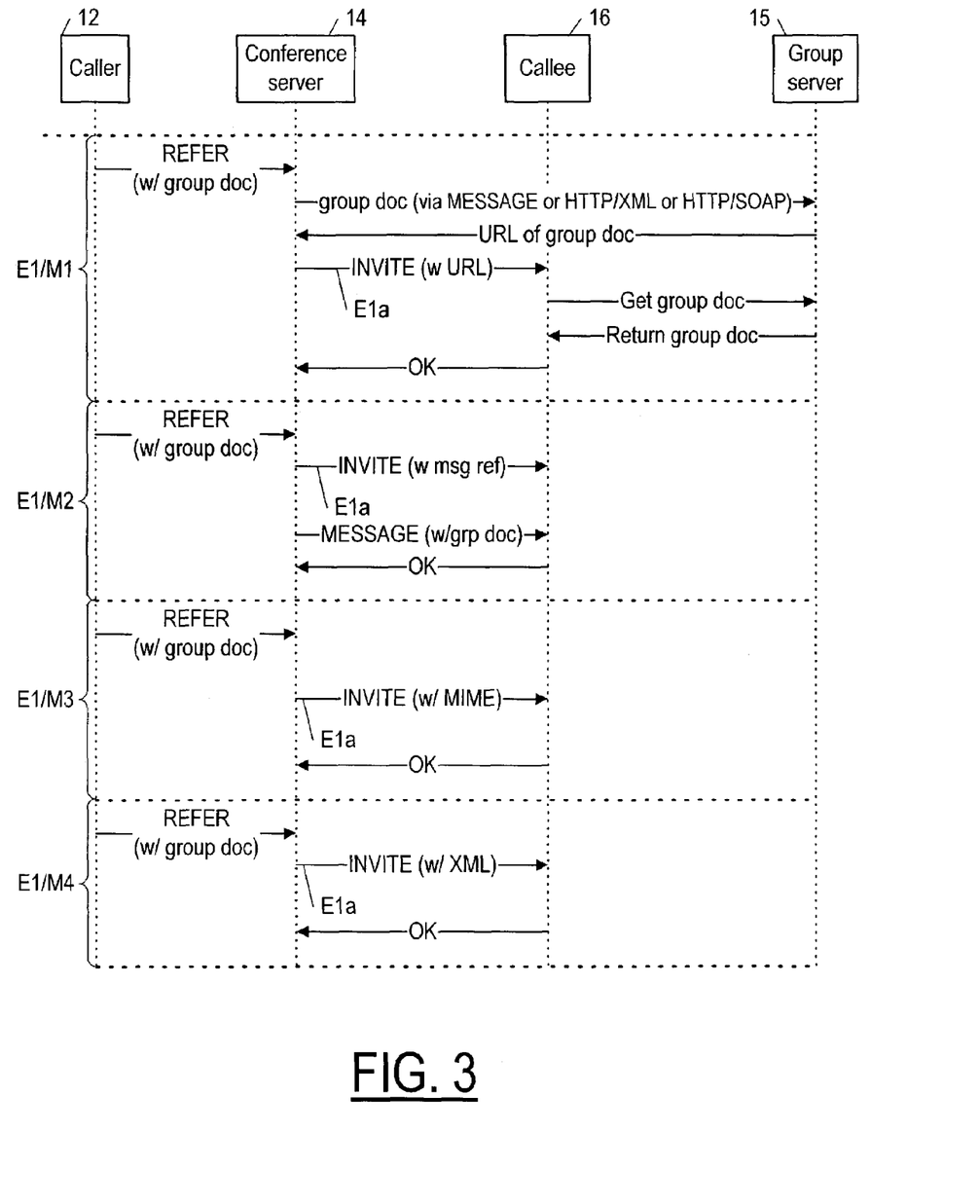
FIG. 3 is a schematic illustrating the use of each of the communication mechanisms of FIG. 2 in an embodiment according to the first embodiment for which a scenario is illustrated in FIG. 1.

As mentioned, each of the embodiments E1 E2 E3 E4 includes a respective step E1a E2a E3a E4a in which the caller terminal 12 signals to the callee terminal 16 (possibly via a conference server 14) a call setup communication, and the caller terminal 12 (or conference sever 14) includes in the call setup communication an indication that the call being set up is a conference call and also includes a reference (such as a URL or a reference to a SIP MESSAGE) to the group document (information indicating other invited participants) or includes the group document itself either in one header or in the body, e.g. using MIME (Multipurpose Internet Mail Extension) multipart content. It is important to understand that what is shown in FIG. 1 are specific scenarios according to each of four embodiments. Actual message flows according to each of the embodiments can differ in some respects from those shown for the scenarios illustrated in FIG. 1, or in other words, scenarios can be illustrated for each of the four embodiments with message flows that are different from what is shown in FIG. 3 in some respects. What is the same for any scenario for each embodiment is the message flow corresponding to the step E1a E2a E3a E4a in which the caller terminal 12 signals to the callee terminal 16 (possibly via a conference server 14) a call setup communication including either a reference to the group document or the group document itself. Thus, in particular, in the embodiment E1, instead of including in the INVITE communication of step E1a a URL for the group document, the group document can itself be included in the INVITE communication, and thus, in such a scenario, the message flows "get group document" and "return group document" between the callee 16 and the group server 15 would not occur.

Figure 2:
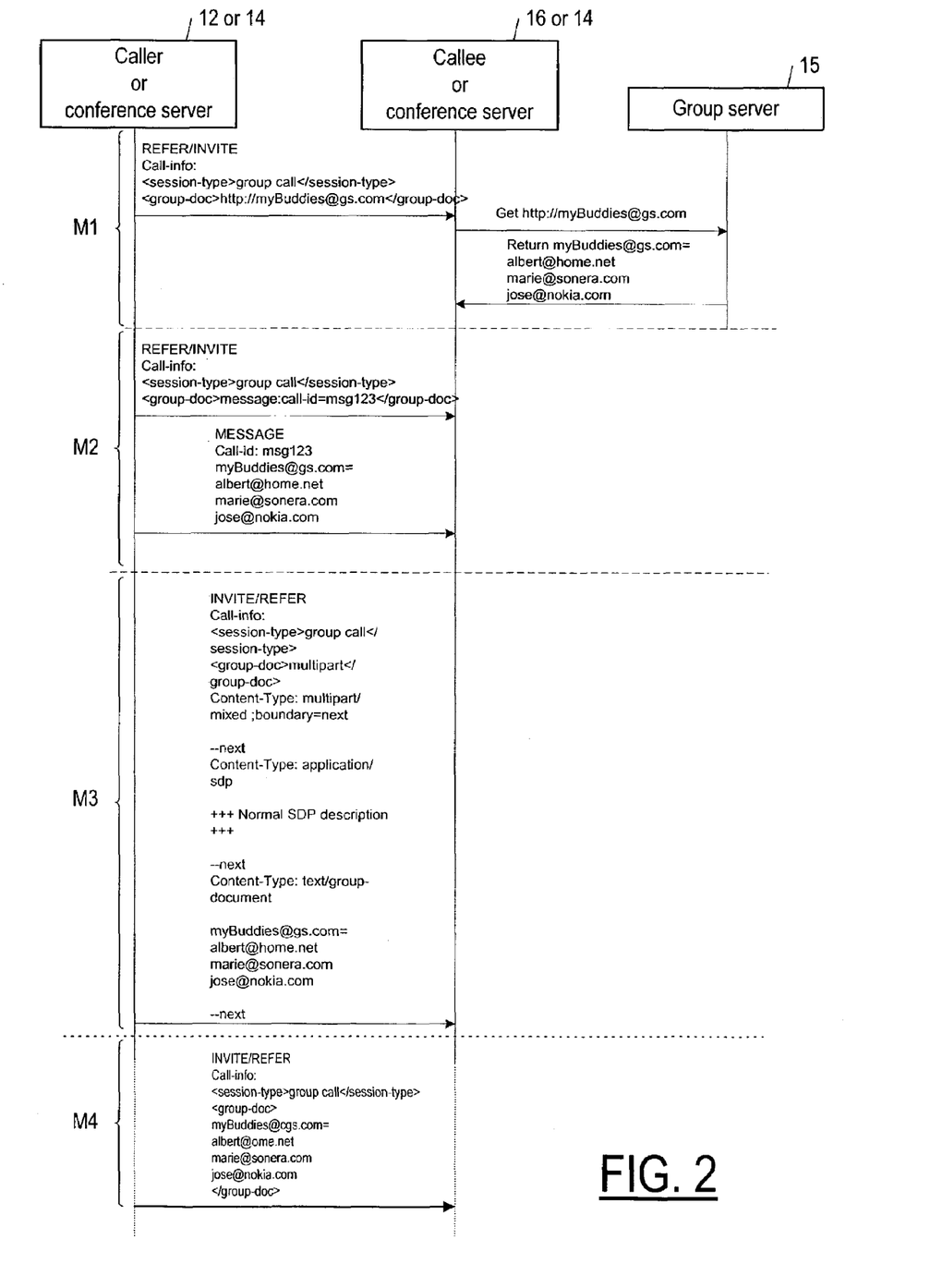
FIG. 2 is a schematic illustrating different mechanisms by which the group document is communicated between entities, such as between the caller and the conference server.

Referring now to FIG. 2, various specific alternative mechanisms M1 M2 M3 M4 are indicated by which, in each of the embodiments E1 E2 E3 E4, the group document may be included in the respective step E1a E2a E3a E4a in which the caller terminal 12 signals to the callee terminal 16 (possibly via a conference server 14) the call setup communication. For example, and referring now also to FIG. 3, the embodiment E1 (FIG. 1) is shown in four different scenarios each using a different one of the mechanisms M1 M2 M3 M4, as indicated (using E1/M1 to indicate mechanism M1 used for embodiment E1, and so on). Thus, in the scenario in FIG. 3 using mechanism M1, in the step E1a in which the conference server 14 sends an INVITE communication to the callee 16, the Call-info header of the INVITE includes (in XML script or any similar language, such as XHTML, or in any form able to be displayed directly to the user) the URL for the group document, as indicated in FIG. 2 for mechanism M1. In the scenario in FIG. 3 using mechanism M2, in the step E1a, the Call-info header of the INVITE communication from the conference server 14 includes a reference to a MESSAGE communication also sent by the conference server 14 to the callee 16, and the group document is included in the MESSAGE communication. (FIG. 3 shows only part of the SIP message sequence for call setup;

e.g. in E1/M3, an ACK communication is sent by the conference server 14 upon receiving the OK communication from the callee 16.) In the scenario in FIG. 3 using mechanism M3, in the step E1a, the Call-info header of the INVITE communication from the conference server 14 includes the group document itself as a MIME enclosure, and in the scenario using mechanism M4, the group document is included in the Call-info header of the INVITE communication of step E1a as XML script. (MIME refers to an official Internet standard that specifies how messages must be formatted so that they can be exchanged between different email systems; it enables communicating many types of files or documents in an email message, including text, images, audio, video, and other application-specific data.

Referring now again to FIG. 1, in the other embodiments E2 E3 E4, in the scenarios indicated there (which are only some possible scenarios) the caller (terminal) 12 places the group document on the group server 15 prefatory to the call being set up, and in response the group server 15 returns the URL for the group document. In placing the group document on the group server 15, just as in the scenario indicated for embodiment E1, the group document can be conveyed to the group server 15 using various means, such as e.g. a SIP MESSAGE communication or a HTTP/XML communication or a HTTP/SOAP communication. Then, in the E2 scenario, in the step E2a setting up the conference call, the caller terminal 12 sends the callee 16 a REFER communication including the URL of the group document. When the callee 16 receives the REFER communication, it uses the URL included in the Call-info header to retrieve the group document, and it then displays the list of participants to the user of the callee (terminal) 16. The user, upon deciding to participate in the conference call, has the callee 16 send a SIP INVITE communication to the conference server 14, to which the conference server responds with a SIP OK, thus completing the call setup (for the callee 16).

Still referring to FIG. 1, in the E3 scenario, after placing the group document on the group server 15, the caller 12 sends a SIP communication to the conference server 14 indicating a scheduled time and date for a conference call with the members of the group indicated by the group document, and includes in the communication the URL of the group document. In the E3 embodiment, unlike in the other embodiments, the conference server will, at the scheduled time, send an INVITE communication to each URI indicated in the group document, the group document preferably includes the URI of the caller too, not only the URIs of the callees. (It is of course also possible that the conference server can be made to send the INVITE communication to the caller at the scheduled time using some other mechanism, such as e.g. adding the caller to the group document if the caller is not already included, when the conference server first receives the group document from the caller.) Also, it should be understood that the E3 embodiment differs from the E1, E2 and E4 embodiments in that the conference call is ultimately initiated based on only a single communication from the caller to the conference server, namely the initial communication in the message sequence diagram of FIG. 1 from the caller to the conference server, the communication providing the scheduled time and the group document or its URL. In the other embodiments, the caller sends a REFER communication to the conference server for each callee, since it is the Refer-to header in the REFER communication that prompts the conference server to send INVITE communication to the callees in the other embodiments.

Figure 5:
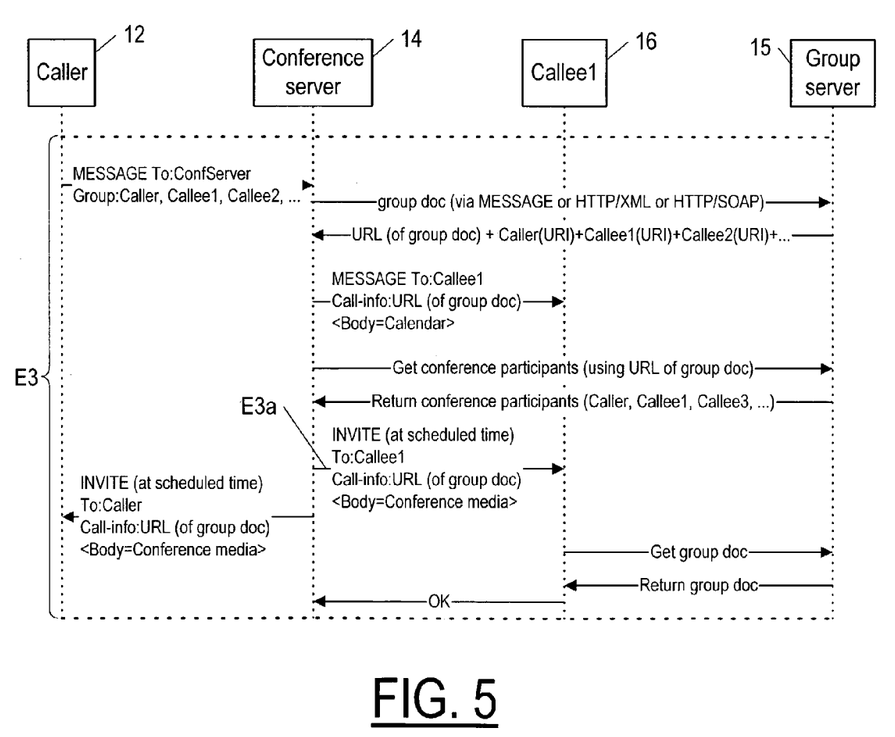
FIG. 5 is another scenario according to the third embodiment for which a scenario is illustrated in FIG. 1.

Still referring to the scenario for the E3 embodiment as shown in FIG. 1, the communication sent from the caller 12 first to the conference server 14 is an SIP communication/method, although not an INVITE communication, but instead a communication such as MESSAGE or PUBLISH, and includes the group document or its URL and also includes a further parameter indicating that INVITE communications are to be sent to the participants indicated in the group document, but only at a scheduled time as indicated by a calendar event included in the SIP communication. In indicating a scheduled time and date for the conference call, vCalendar or some other non-real-time scheduling mechanism can be used. In case of using specifically vCalendar, as opposed to some other non-real-time invitation (i.e. scheduling) mechanism, the notification that a conference call is being set up is provided as what is called an event including a piece of data indicating that a conference call is scheduled for some future time and date. The URL for the group document can be included in the communication as part of the event or separate from it. (vCalendar is an open specification providing an exchange format for personal scheduling information, able to be used in exchanging information across a broad range of transport methods.) At the scheduled time and date, the conference server 14 sends to the callee 16 (and also to the other callees, as well as to the caller) and INVITE communication including in the Call-info header the URL of the group document. The scenario then proceeds as in the E1 scenario (with the callee retrieving the group document from the group server 15, examining it, and responding to the conference server 14 with a SIP OK, thereby completing call setup). (Another scenario according to the E3 embodiment is indicated in FIG. 5 and described below.)

Still referring to FIG. 1, in the E4 scenario, after placing the group document on the group server 15, the caller 12 sends a REFER communication to the conference server 14 and includes in the Call-info header of the REFER communication the URL of the group. The conference server then retrieves the group document (in message flows not shown), determines that callee 16 is a member of the group, and sends the callee 16 a INVITE communication, including in the Call-info header of the INVITE communication the URL of the group document. The scenario then proceeds as in the E1 scenario.

The invention thus comprehends four embodiments E1 E2 E3 E4 (FIG. 1), each allowing up to four mechanisms M1 M2 M3 M4 (FIG. 2) by which the callee 16 obtains the group document. When mechanisms M2 (separate MESSAGE) M3 (MIME) or M4 (XML script) are used, there are no message flows to or from the group server 15, and so in case of using the mechanisms M2 M3 M4 not making use of a URL for the group document, embodiment E4 is the same as embodiment E1.

Figure 4:
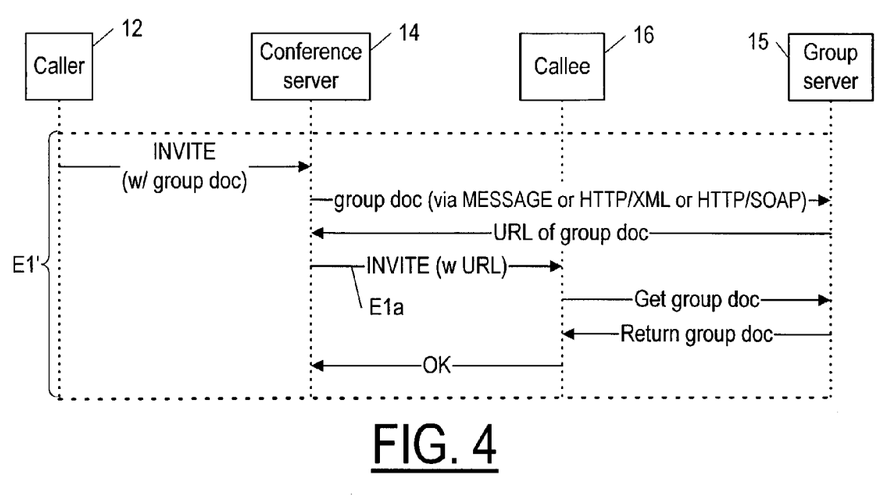
FIG. 4 is a schematic illustrating a scenario according to the first embodiment for which a scenario is illustrated in FIG. 1, but with the embodiment modified to use a group invitation mechanism according to the invention.

Referring now to FIG. 4, the invention also comprehends an embodiment E1' (corresponding to embodiment E1 FIG. 1), an embodiment in which the conference server uses the group document as the basis for determining the URI's to which it is to issue an INVITE communication. In the embodiment E1', the caller 12 sends an INVITE communication carrying the group document to the conference server 14, which examines the group document and then issues INVITE communications to all members in the group document (except the caller 14), in what amounts to a "group INVITE" mechanism. In some embodiments using the group INVITE mechanism of the invention, the INVITE communication would use a new parameter value for what is called the Content-Disposition header (or a similar SIP header), a value such as "initiate-conference" or some similar token that is used for requesting that the conference server itself initiate an action using information included in the body of the communication or in some other header; the parameter value (such as "initiate-conference") would thus be used to indicate to the conference server that the conference server is to initiate the conferencing itself, using the information in the group document or requesting the participant URIs from the group server 15. Such embodiments save bandwidth by avoiding having the caller send a REFER communication to the conference server for each participant.

Still referring to FIG. 4, in embodiment E1' (embodiment E1 modified to use the group INVITE mechanism), the caller 12 first sends an INVITE communication to the conference server 14, and includes in the INVITE communication the group document (or its URL), and possibly also includes the new "initiate-conference" parameter value. (The group INVITE mechanism could also be used in embodiment E4 of FIG. 1, but since in using the group INVITE mechanism the group document is provided to the conference server 14 by the caller using the group INVITE, modifying embodiment E4 to use the group INVITE would result in embodiment E1', already described above.)

Referring now to FIG. 5, embodiment E3 is shown according to another scenario, differing from the scenario illustrated for embodiment E3 in FIG. 1. Recall that embodiment E3 provides for scheduling a conference call at some future time and date, and the caller 12 need send only a single initial communication to the conference server 14 (namely the communication providing the group document and the scheduled time and date) to have the conference server, at the scheduled time, initiate the conference call. In the scenario for E3 shown in FIG. 5, the caller 12 first sends the conference server 14 an SIP MESSAGE including the group document, and the conference server then sends the group document to the group server 15, which, in response, sends to the conference server the URL for the group document as well as the URIs for each (potential, i.e. to-be-invited participant). In the scenario here, it is the group server 15 that parses the group document so as to determine the URIs for each participant, although it is of course possible to have the conference server do so, in which case the group server would not need to return the URIs for the participants, but only the URL for the group document. When the conference server receives the URIs, (in an optional step) it sends a MESSAGE to each callee (callee1, callee2, . . . ) including the URL of the group document and also including the calendar event so that the participant can, if desired, add the conference call to the callee's schedule. In the scenario here, a third callee, callee3, upon receiving the scheduling MESSAGE, is assumed to have viewed the group document and decided not to participate (which it can do by either removing its name from the group document on the group server) or by sending a SIP communication to the conference server, such as a SIP "402 Busy Here" communication. At the scheduled time, the conference server initiates the conference call by sending to each participant (caller and callees, but not callee3) an INVITE communication including the group document URL. Thus, a step E3a is performed, corresponding to the steps E1a E2a E4a of the other embodiments, in which the call setup communication (an INVITE communication from the conference server to the callee) is signalled including an indication that the call being set up is a conference call and also including in the call setup communication either the group document indicating possible participants in the conference call or a reference to the group document.

It should be understood that the call set up described and shown in the various embodiments above can be a call set up for either a voice call or for a messaging session, such as a co-called instant messaging session, in which parties exchange text or graphics (or both) in real-time, i.e. so that the messages are provided to the other participants in the conference call substantially without delay.

It is to be understood also that the above-described arrangements are only illustrative of the application of the principles of the present invention. In particular, it should be understood that the invention is of use in any communication network that uses SIP signalling for call setup, not necessarily only wireless communication systems that use SIP signalling. Numerous modifications and alternative arrangements may be devised by those skilled in the art without departing from the scope of the present invention, and the appended claims are intended to cover such modifications and arrangements.

What is claimed is:

1. A method for use by a caller terminal in setting up a conference call for a voice call or messaging session to a callee terminal, the caller terminal subscribed to a component of a communication network including a conference server functioning as a signaling node for the conference call, the communication network using session initiation protocol signaling for call set up, the method comprising the caller terminal signaling according to session initiation protocol a call setup communication to the callee terminal either via the conference server or directly, the caller terminal including in the call set up communication an indication that the call being set up is a conference call and also including in the call setup communication either a group document indicating possible participants in the conference call or a reference to the group document, wherein if the caller terminal provides the call setup communication to the callee terminal via the conference server then the conference server communicates to the callee terminal either the group document or a reference to the group document.

2. The method of claim 1, wherein the communication network includes a wireless communication component.

3. The method of claim 1, further comprising the callee, upon receiving the call setup communication, displaying or otherwise providing the indication that the call being set up is a conference call and displaying or otherwise providing the group document indicating possible participants in the conference call.

4. A mobile station, comprising means for performing the steps of claim 3 indicated as steps performed by the caller and the callee.

5. The method of claim 1, wherein the call setup communication is a session initiation protocol INVITE or REFER communication including a Call-info header, and the indication that the call being set up is a conference call and the group document or reference to the group document are both included in the Call-info header.

6. The method of claim 5, wherein the caller sends the conference server a REFER communication, and in response, the conference server issues an INVITE communication to the callee.

7. The method of claim 6, wherein the conference server uses a uniform resource identifier in a Refer-to header of the REFER communication as a basis for determining that an INVITE communication is to be provided to the callee.

8. The method of claim 5, wherein a group server hosts a data store holding the group document and the group server provides a uniform resource locator for the group document upon receiving the group document and storing the group document in the data store, and wherein the reference to the group document is the uniform resource locator indicating the group document on the group server of the communication network.

9. The method of claim 8, wherein the group server is a component of the conference server.

10. The method of claim 5, wherein the reference to the group document is a reference to a session initiation protocol MESSAGE communication sent to the callee.

11. The method of claim 5, wherein the group document is included in the Call-info header as a multipart mail multipurpose Internet mail extension enclosure.

12. The method of claim 5, wherein the group document is included in the Call-info header as extensible markup language script.

13. The method of claim 1, wherein the conference server uses the group document as a basis for determining that an INVITE communication is to be provided to the callee.

14. The method of claim 13, wherein the conference server is prompted to send an INVITE communication to the callee and to other possible participants included in the group document based on receiving an INVITE communication from the caller.

15. The method of claim 14, wherein the INVITE communication prompting the conference server to send an INVITE communication to the callee and to other possible participants in the group document includes a parameter value for indicating to the conference server that the conference server is to send the INVITE communication to the callee and to the other possible participants.

16. A conference server, comprising means for performing the steps of claim 1 indicated as steps performed by the conference server.

17. A system, comprising a conference server functioning as a signaling node for enabling a conference call and also including a group server for holding and making accessible group documents indicating members of a group, wherein the conference server, upon receiving from a caller terminal prefatory to a call setup communication a communication including a group document indicating possible participants in the conference call or a reference to the group document, provides to a callee terminal the call setup communication including either the group document or the reference to the group document.

18. A computer program product comprising: a computer readable storage structure embodying computer program code thereon for execution by a computer processor in a caller terminal in setting up a conference call for a voice call or messaging session to a callee terminal, the caller terminal subscribed to a component of a communication network including a conference server functioning as a signaling node for the conference call, the communication network using session initiation protocol signaling for call set up, with said computer program code comprising:

computer program code for causing the computer processor of the caller terminal to provides according to session initiation protocol signaling a call setup communication to the callee terminal either via the conference server or directly, wherein if the caller terminal provides the call setup communication to the callee terminal via the conference server then the conference server communicates to the callee terminal either a group document indicating possible participants in the conference call or a reference to the group document;

wherein in signaling to the callee terminal the call setup communication, the caller terminal includes in the call setup communication an indication that the call being set up is a conference call and also includes in the call setup communication either a group document indicating possible participants in the conference call or a reference to the group document.

19. A computer program product comprising: a computer readable storage structure embodying computer program code thereon for execution by a computer processor in a conference server in communication with a caller terminal setting up a conference call for a voice call or messaging session to a callee terminal, the caller terminal subscribed to a component of a communication network including the conference server, the conference server functioning as a signaling node for the conference call, the communication network using session initiation protocol signaling for call set up, with said computer program code comprising:

computer program code for causing the computer processor of the conference server to signal according to session initiation protocol a call setup communication to the callee terminal;

wherein in signaling to the callee terminal the call setup communication, the conference server includes in the call setup communication an indication that the call being set up is a conference call and also includes in the call setup communication either a group document indicating possible participants in the conference call or a reference to the group document.

* * * * *